United States Patent
Lee et al.

(10) Patent No.: US 7,532,821 B2
(45) Date of Patent: May 12, 2009

(54) APPARATUS FOR OPTICAL CLOCK EXTRACTION

(75) Inventors: Jae-Myoung Lee, Seoul (KR); Je-Soo Ko, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 591 days.

(21) Appl. No.: 11/294,119

(22) Filed: Dec. 5, 2005

(65) Prior Publication Data

US 2006/0233555 A1   Oct. 19, 2006

(30) Foreign Application Priority Data

Apr. 19, 2005 (KR) .................... 10-2005-0032492

(51) Int. Cl.
*H04B 10/00* (2006.01)
(52) U.S. Cl. .................................................. 398/155
(58) Field of Classification Search ............ 398/155, 398/160
See application file for complete search history.

(56) References Cited

U.S. PATENT DOCUMENTS

| | | |
|---|---|---|
| 6,088,144 A | 7/2000 | Doerr |
| 6,501,579 B2 | 12/2002 | Li et al. |
| 6,542,277 B2 | 4/2003 | Lange et al. |
| 6,804,471 B1 | 10/2004 | Ionov et al. |
| 2005/0244162 A1 * | 11/2005 | Evans et al. ............ 398/98 |

FOREIGN PATENT DOCUMENTS

| | | |
|---|---|---|
| JP | 09-284234 | 10/1997 |
| KR | 1020030047966 A | 6/2003 |

OTHER PUBLICATIONS

"All-optical clock recovery from 40 Gbit/s NRZ signal based on clock line enhancement and sharp periodic filtering," G. Contestabile et al, Electronics Letters, Oct. 14, 2004, vol. 40, No. 21.

* cited by examiner

*Primary Examiner*—Quan-Zhen Wang
(74) *Attorney, Agent, or Firm*—Ladas & Parry LLP

(57) ABSTRACT

Provided is an apparatus for an optical clock extraction, which is capable of providing high optical amplification rate and more efficient noise cancellation by using a Fabry-Perot (FP) filter and an optical amplifier. In the apparatus, an optical circulator changes a direction of an inputted optical signal. The FP filter extracts different frequency components existing on a spectrum of the inputted optical signal and being spaced apart by a clock frequency, removes noise from a reflected and amplified optical signal, and transmits the resulting signal to the optical circulator. An optical amplifier performs a primary amplification to equalize two different frequency components outputted from the filter, and performs a secondary amplification on an optical signal reflected and fed back thereto. A reflector reflects the primarily-amplified optical signal to the optical amplifier.

9 Claims, 2 Drawing Sheets

APPARATUS FOR OPTICAL CLOCK EXTRACTION

FIELD OF THE INVENTION

The present invention relates to an apparatus for an optical clock extraction; and, more particularly, to an apparatus for an optical clock extraction, which is capable of providing high optical amplification rate and more efficient noise removal by using a Fabry-Perot (FP) filter and an optical amplifier.

DESCRIPTION OF RELATED ART

Examples of methods for an optical clock extraction are a method using a self-pulsating of a laser diode, a method using an optical loop mirror, and so on. Meanwhile, it is still difficult to fabricate a device for extracting desired clock, and an optical system is still unstable. One of methods for solving these problems is to restore a clock signal using frequency components existing on an optical spectrum.

Clock components (f1, f3 in FIG. 1) exist on a spectrum at relatively large values. The clock frequency corresponding to the frequency difference between two spectral lines (f1 and f2, or f2 and f3) is obtained by extracting and beating two adjacent frequency components corresponding to data rate of a received signal.

That is, as shown in FIG. 1, an optical spectrum of an NRZ signal exhibits three peaks and the frequency distance between the peaks corresponds to a clock frequency. Thus, in FIG. 1, the clock can be made by extracting and beating the first and second peaks or the second and third peaks.

A clock frequency component may not exist on the spectrum depending on modulation schemes. In an optically modulated signal, however, a clock component exists in an NRZ signal as well as an RZ signal on the optical spectrum. Thus, the clock component can be extracted using the frequency components existing on the optical spectrum. In accordance with a method using an FP filter, a tank circuit is configured using a characteristic of an FP filter, thereby extracting good quality of clock.

FIG. 2 is a block diagram of a conventional apparatus for optical clock extraction using an FP filter.

Referring to FIG. 2, two frequency components are extracted using an FP filter 11 having a free spectral range (FSR) equal to data rate of a transmitted data, and then are amplified by an optical amplifier 12. A band pass filter 13 removes noise generated at the optical amplifier 12. Then, a clock signal is restored.

That is, in order to extract the clock from the signal, a tank circuit is configured using the FP filter 11 and the optical amplifier 12. In case where a clock is extracted from a PRZ signal that is made so as to extract the clock from a signal, especially an NRZ signal, the clock extraction is difficult when there are successive "0" signals. However, if the tank circuit is configured using the FP filter 11 and the optical amplifier 12, the above problem can be solved using a characteristic that the FP filter 11 and the optical amplifier 12 maintain a previous waveform for a time. That is, the clock extraction apparatus is configured using an FP filter 11 and an optical amplifier 12 and a band pass filter to remove the noise generated at the optical amplifier 13.

According to the conventional clock extraction apparatus, the optical clock component can be extracted by passing one time the optical signal through the FP filter 11, the optical amplifier 12, and the band pass filter 13. However, when large amplification rate is required, a relatively expensive amplifier has to be used. In addition, noise generated at the amplifier has to be removed using a separate band pass filter 13.

SUMMARY OF THE INVENTION

It is, therefore, an object of the present invention to provide an apparatus for an optical clock extraction, which is capable of providing high optical amplification rate and more efficient noise removal by using an FP filter instead of a band pass filter.

In accordance with an aspect of the present invention, there is provided an apparatus for optical clock extraction, including: an optical circulator for changing a direction of an inputted optical signal; a filter for extracting different frequency components existing on a spectrum of the inputted optical signal and being spaced apart by a clock period, removing noise from a reflected and amplified optical signal, and transmitting the resulting signal to the optical circulator; an optical amplifier for performing a primary amplification to equalize two different frequency components outputted from the filter, and performing a secondary amplification on an optical signal reflected and fed back thereto; and a reflector for reflecting the primarily-amplified optical signal to the optical amplifier.

In addition, the apparatus may further include a band pass filter for passing two adjacent peaks (frequency components) existing on the spectrum of the inputted optical signal, and transmitting the two peaks to the optical circulator.

Further, the apparatus may further include an optical delay unit for correcting signal distortion caused by a phase difference between an optical signal reflected by the reflector and inputted to the filter and an original signal inputted to the filter.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 3:
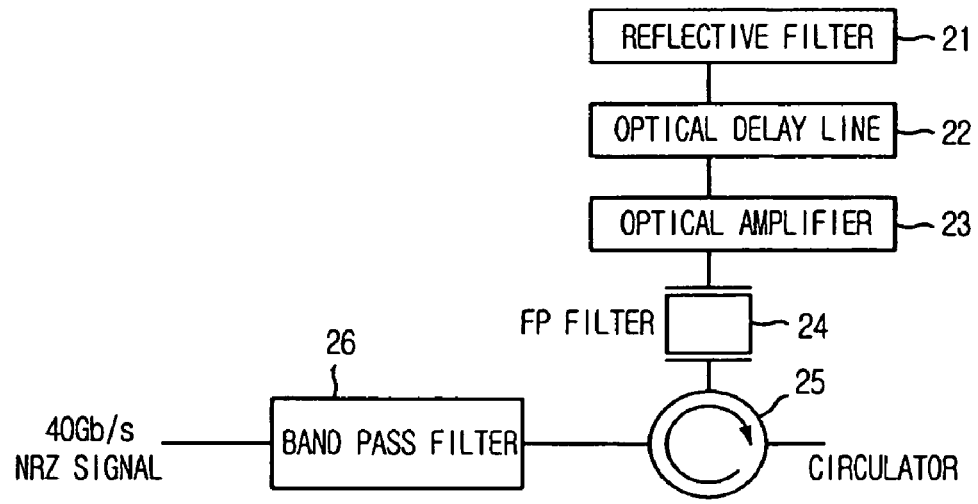
FIG. 3 is a block diagram of an apparatus for optical clock extraction using an FP filter and an optical amplifier in accordance with an embodiment of the present invention.

FIG. 3 is a block diagram of an apparatus for optical clock extraction using an FP filter and an optical amplifier in accordance with an embodiment of the present invention.

Figure 1:
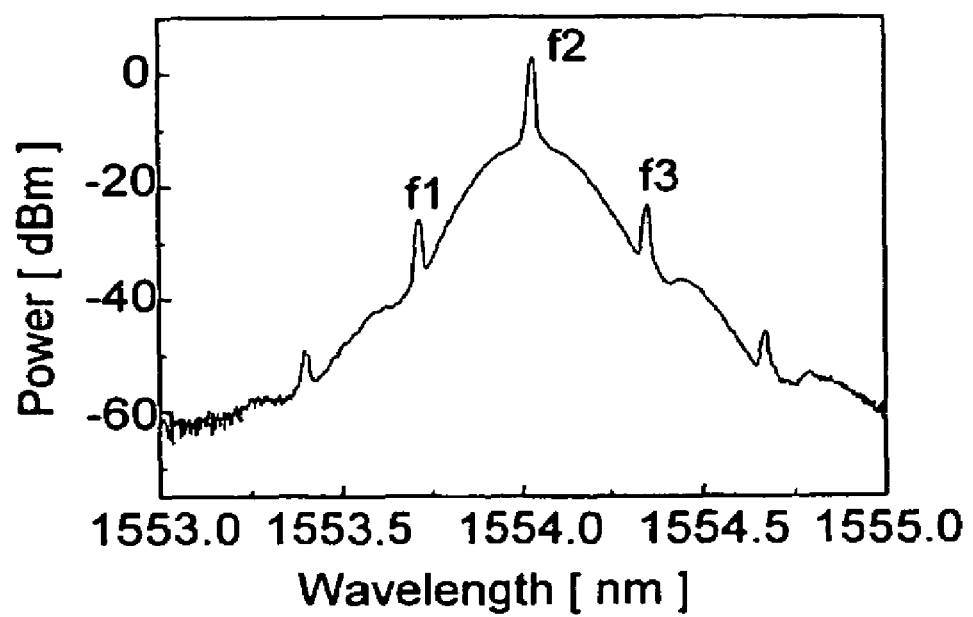
FIG. 1 is a graph illustrating an optical spectrum of an NRZ signal.

In general, as shown in FIG. 1, an optical spectrum of an NRZ signal exhibits three peaks. A frequency distance between the adjacent peaks corresponds to a clock frequency. Thus, a clock can be made by extracting and beating the first and second peaks or the second and third peaks.

Accordingly, a band pass filter 26 arranged in a signal input stage passes only two adjacent peaks. Except the two frequency components, other components existing between the two peaks are suppressed by an FP filter 24. Magnitudes of the two extracted components can be different from each other. They can be equalized to each other by operating an optical amplifier 23 in a saturation region. In case where the two frequency components cannot be equalized due to large amplitude difference between them even when the optical amplifier 23 is operated in the saturation region, they can be equalized by adjusting the band pass filter 26.

The function of the band pass filter 26 passing two adjacent peaks (frequency components) existing on the spectrum of the inputted optical signal can be performed by the FP filter 24. Hereinafter, it is assumed that two different frequency components are extracted by the FP filter 24.

The inputted optical signal is transmitted to the FP filter by means of a circulator 25. The two frequency components are extracted by the FP filter 24 and are amplified by the optical amplifier 23. The amplified signals are reflected by a reflective filter 21, so that their traveling direction is changed. These signals are again amplified by the optical amplifier 23 and then pass through the FP filter 24. While the amplified signal passing the FP filter, noise generated at the optical amplifier 23 is removed.

A saturation characteristic of the optical amplifier 23 is used to equalize the magnitudes of the two frequencies by properly adjusting a magnitude of the inputted signal. When the two different frequency components extracted by the FP filter 24 pass through the optical amplifier 23, their magnitudes are saturated and can be equalized. To extract the clock component, the FSR of the FP filter should be equal to the clock frequency of the signal. Then, the clock component is reflected by the reflective filter 21 and noise is removed from the signal by passing through the FP filter.

In accordance with the present invention, the signals pass two times through the FP filter 24 and the optical amplifier 23, and passes two times through the bi-directional amplifier, thereby increasing an entire amplification rate (assuming that the amplification rate of the optical amplifier 23 is $\alpha$, the entire amplification rate can be up to $\alpha^2$). The FP filter 24 operates as a filter for client extraction, and a filter that removes noise generated at the optical amplifier 23. Preferably, the reflective filter 21 is configured with a Chirped Grating Filter (CGF), and reduces signal dispersion when the signal is reflected by the reflective filter 21. At this time, the reflective filter 21 has only to perform a mirror function. Examples of the reflective filter 21 are a Faraday rotator mirror, an FBG filter, a CGF filter, and so on. Among them, the CGF filter can reduce the dispersion that is generated while the signal is transmitted.

More specifically, the circulator 25 changes the direction of the inputted optical signal. The FP filter 24 extracts different frequency components existing on the spectrum of the inputted optical signal and spaced apart by the clock frequency, removes noise of the reflected and amplified optical signal, and transmits it to the circulator 25. The optical amplifier 23 primarily amplifies the frequency components that had passed through the FP filter 24, and it can also make the two frequency components equal to each other by amplifying the two frequency components in a saturation region. The optical amplifier 23 secondarily amplifies the reflected and fed-back optical signal. The reflective filter 21 reflects the primarily-amplified optical signal toward the optical amplifier 23. In addition, the band pass filter 26 is placed before the circulator 25, and passes two adjacent peaks (frequency components) existing on the spectrum of the inputted optical signal. Accordingly, the two frequency components can be transmitted to the FP filter 24. An optical delay line 22 can be further included. The optical delay line 22 corrects signal distortion caused by a phase difference between the optical signal reflected by the reflective filter 21 and inputted to the FP filter 24 and the original signal inputted to the FP filter 24.

The optical amplifier 23 receives two different frequency components extracted through the band pass filter 26 and the FP filter 24, and equalizes the magnitudes of the two frequency components by using the saturation characteristic of the amplifier.

The apparatus for the optical clock extraction enables the use of the optical amplifier 23 having a small amplification rate by employing the reflective filter 21. In addition, by using the FP filter 24, the quality of the clock component can be improved by the clock extraction and noise removal function.

That is, the magnitude of the signal that have passed through the FP filter 24 is amplified through the optical amplifier 23 (primary amplification), and this signal is reflected by the reflective filter 21 and is again amplified by the optical amplifier 23 (secondary amplification). Accordingly, assuming that the amplification rate is $\alpha$, the signal can be finally amplified up to $\alpha^2$. Even when the optical amplifier 23 with a relatively low amplification rate is used, a larger amplification rate than that of the conventional structure can be obtained.

Figure 2:
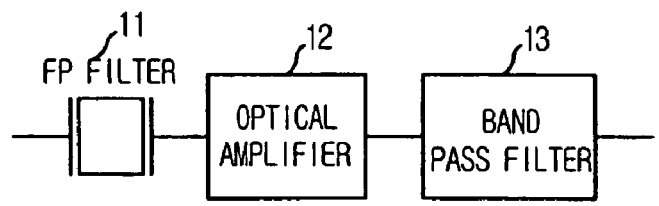
FIG. 2 is a block diagram of a conventional apparatus for optical clock extraction using an FP filter.

When receiving the external input signal, the FP filter 24 extracts two frequency components and removes noise generated at the optical amplifier 23, when the signal reflected by the reflective filter 21 and fed back is amplified by the optical amplifier 23. In addition, the FP filter 24 performs the function of the band pass filter (13 in FIG. 2) of the conventional structure. Accordingly, since the external input signal passes through the FP filter 24 two times, so that finesse of the extracted frequency components. is enhanced.

The chirped grating filter 21 can be used to eliminate the dispersion occurring when the optical signal is reflected by the filter. The optical delay line 22 is used to adjust the optical path length so as to satisfy the resonance condition in the optical amplifier between the input signal from the circulator and the input signals reflected by the reflective filter 21.

According to the present invention, the amplification rate that can be obtained from the optical amplifier 23 is more enhanced, and noise generated at the optical amplifier 23 is removed by the FP filter 24 which is also used for the extraction of the clock component, instead of another band pass filter to remove the noise generated by the amplifier.

Hereinafter, an operation of the apparatus for the optical clock extraction will be described in detail.

First, the external input signal passes through the FP filter 24 with the FSR corresponding to the clock frequency to thereby generate the clock component. This signal is then amplified through the optical amplifier 23. The amplified signal is reflected by the reflective filter 21 and is again inputted to the FP filter 24 through the optical amplifier 23. That is, the initial clock component extracted through the FP filter 24 passes two times through the optical amplifier 23 and are amplified two times, and also passes two times through the FP filter 24. Therefore, compared with the case of one-time passing, a relatively large finesse is provided.

Accordingly, the entire amplification rate that can be obtained through the optical amplifier 23 can be up to $\alpha^2$, where $\alpha$ is an amplification rate of the amplifier 23. In addition, the signal reflected by the reflective filter 21 passes through the optical amplifier 23 and is inputted to the FP filter, thereby improving the finesse. At this time, the FP filter 24 functions to remove noise generated at the optical amplifier 23. Therefore, the band pass filter need not be used.

The optical delay line 23 can be used to adjust the optical path length so as to correct the signal distortion caused by a phase difference between the signal reflected by the reflective filter 21 and inputted to the FP filter 24 and the original signal inputted to the FP filter 24.

According to the present invention, the more improved amplification rate can be obtained by amplifying two times the signals through the optical amplifier. In addition, one FP filter performs the clock extraction and the noise removal (the function of the band pass filter), thereby obtaining more improved performance.

The method of the present invention can be embodied as a program and stored in recording media readable by a computer, e.g., CD-ROM, RAM, floppy disk, hard disk, magneto-optical disk, etc.

The present application contains subject matter related to Korean patent application No. 10-2005-0032492, filed in the Korean Patent Office on Apr. 19, 2005, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for optical clock extraction, comprising:
    an optical circulator for changing a direction of an inputted optical signal;
    a filter for extracting different frequency components existing a spectrum of the inputted optical signal, removing noise from a reflected and amplified optical signal, and transmitting the resulting signal to the optical circulator, wherein the difference in the frequency components on the spectrum represents a clock frequency;
    an optical amplifier for performing a primary amplification to equalize two different frequency components outputted from the filter, and performing a secondary amplification on an optical signal reflected and fed back thereto; and
    a reflector for reflecting the primarily-amplified optical signal to the optical amplifier,
    wherein the filter is connected between the optical circulator and a first input/output terminal of the optical amplifier, and
    wherein the reflector is located after a second input/output terminal of the optical amplifier for reflecting the primarily-amplified optical signal to the second input/output terminal of the optical amplifier.

2. The apparatus as recited in claim 1, further comprising a band pass filter for passing two adjacent peaks (frequency components) existing on the spectrum of the inputted optical signal, and transmitting the two peaks to the optical circulator.

3. The apparatus as recited in claim 2, wherein the optical amplifier operates in a saturation region to equalize the two different frequency components extracted by the band pass filter and the filter.

4. The apparatus as recited in claim 3, wherein when magnitude difference between the two frequency components are so large that the optical amplifier does not operate in the saturation region to equalize the two different frequency components, the band pass filter is controlled to equalize the magnitudes of the two frequency components.

5. The apparatus as recited in claim 3, wherein the reflector uses a reflective filter to increase an amplification rate to a maximum $a^2$, where a is an amplification rate of the optical amplifier.

6. The apparatus as recited in claim 5, wherein the reflective filter is a Chirped Grating Filter (CGF) for eliminating the dispersion between frequency components occurring when an optical signal is reflected by a filter.

7. The apparatus as recited in claim 6, wherein the optical delay unit is an optical delay line for adjusting the optical path length so as to satisfy a resonance condition in the optical amplifier between the signal reflected by the reflective filter and the input signal from the circulator, such that signal distortion caused by a phase difference between the signal reflected by the reflective filter and the input signal from the circulator can be corrected.

8. The apparatus as recited in claim 1, further comprising an optical delay unit for correcting signal distortion caused by a phase difference between an optical signal reflected by the reflector and inputted to the filter and an original signal inputted to the filter.

9. The apparatus as recited in claim 1, wherein the filter is a Fabry-Perot (FP) filter that extracts a clock component by making a free spectral range (FSR) of the FP filter equal to a clock frequency of an input signal, and removes noise from a signal reflected by the reflector and passing through the optical amplifier.

* * * * *